(12) United States Patent
Fujioka et al.

(10) Patent No.: US 6,793,748 B2
(45) Date of Patent: Sep. 21, 2004

(54) DISK BONDING APPARATUS AND DISK BONDING METHOD

(75) Inventors: Toshiyuki Fujioka, Osaka (JP); Akinobu Katayama, Kyoto (JP); Toshikazu Kozono, Neyagawa (JP); Kiyoshi Mayahara, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 177 days.

(21) Appl. No.: 10/151,796

(22) Filed: May 21, 2002

(65) Prior Publication Data
US 2003/0006004 A1 Jan. 9, 2003

(30) Foreign Application Priority Data
May 25, 2001 (JP) .................................... P 2001-157161

(51) Int. Cl.⁷ ................................................. G11B 7/26
(52) U.S. Cl. ................... 156/64; 156/272.2; 156/275.5; 156/275.7; 156/350; 156/366; 156/378; 156/379.9; 156/380.9
(58) Field of Search .......................... 156/272.2, 275.5, 156/275.7, 64, 350, 366, 378, 379.6, 379.8, 379.9, 380.9; 369/286; 428/64.4, 65.2

(56) References Cited

U.S. PATENT DOCUMENTS

| 5,779,855 | A | * | 7/1998 | Amo et al. | ............... | 156/379.6 |
| 5,900,098 | A | * | 5/1999 | Mueller et al. | .......... | 156/275.7 |
| 6,291,046 | B1 | * | 9/2001 | Ohno et al. | ................ | 428/64.1 |

FOREIGN PATENT DOCUMENTS

| JP | 09-128823 | 5/1997 |
| JP | 2001-216692 | 8/2001 |

\* cited by examiner

Primary Examiner—Jeff H. Aftergut
Assistant Examiner—John T. Haran
(74) Attorney, Agent, or Firm—Pearne & Gordon LLP

(57) ABSTRACT

It is an object to provide an optical recording medium (disk) bonding apparatus which eliminates the warpage of a disk during bonding and has high precision in the bonding. There are provided means for bonding two substrates and then irradiating radioactive rays from both sides of the substrates when carrying out radiation curing, and a mechanism for shifting the irradiation starts of both radioactive rays to control an amount of warpage of each substrate after the curing.

4 Claims, 3 Drawing Sheets

DISK BONDING APPARATUS AND DISK BONDING METHOD

BACKGROUND OF THE INVENTION

1. Field of the Invention

The present invention relates to a disk bonding apparatus and a disk bonding method, and more particularly to the manufacture of an optical information recording medium obtained by bonding two substrates.

2. Description of the Related Art

A technique for reproducing or recording information having a high density by utilizing a laser beam has been known and has mainly been put into practical use as an optical disk. The optical disk is roughly divided into a read-only type, a write-once type and a rewrite type. The read-only type has been merchandized as a disk referred to as a compact disk recording music information or a disk referred to as a laser disk recording image information. Then, the write-once type has been merchandized as a document file or a static image file. Furthermore, the rewrite type has been merchandized as a data file for a personal computer.

In general, the optical disk has such a configuration that an information layer is provided on one of the main surfaces of a transparent resin substrate having a thickness of 1.2 mm and a protective film such as an overcoat is provided thereon or a protective plate which is identical to the substrate is bonded with a radiation curing resin.

In recent years, various investigations have been made to use an objective lens having a small laser wavelength and a great numerical aperture (NA) in order to increase the density of the optical disk. However, a reduction in the wavelength and an increase in the NA decrease an allowable value of a tilt angle (tilt) of the disk in a direction of irradiation of a laser beam. In order to increase the allowable value of the tilt, it is effective that the thickness of a substrate is reduced and the substrate of a digital video disk (DVD) has a thickness of 0.6 mm, for example.

If a resin substrate having a thickness of 0.6 mm is used singly, the substrate has an inferior mechanical strength. Therefore, two substrates are bonded with an information recording surface provided inside.

For the bonding, a main bonding method includes a method of applying a radiation curing resin onto a substrate and closely bonding another substrate to irradiate radioactive rays, thereby carrying out curing (which will be hereinafter referred to as a radiation curing method). For the radioactive rays, ultraviolet (UV) rays are generally used.

In such a radiation curing method, generally, a radiation curing resin is applied like a doughnut while rotating a substrate at a low speed and a substrate to be bonded is superposed thereon so that two substrates are integrated. Then, a rotation is carried out at a high speed and the radiation curing resin is fully diffused between the substrates and is thereafter cured by the radioactive rays.

In a radiation curing method in both directions of a substrate, for example, Unexamined Patent Publication Hei.09-128823 discloses a curing method and a curing apparatus. In this method and apparatus, an optical disk is inserted between UV curing resins and is applied UV rays from the outer side of the UV curing materials. Unexamined Patent Publication 2001-216692 also discloses a curing apparatus by irradiation form both directions of a disk. In this apparatus, each of amounts of irradiation from both directions is controllable respectively during curing. In the above mentioned techniques, conventionally, both radioactive ray irradiating operations are started at the same time.

Moreover, a warpage test in an apparatus is also carried out. A result of measurement obtained by the warpage test is used for only discrimination of excellent and inferior products.

The curing (gelation) of a bonding material (radiation curing resin) between substrates proceeds instantly (within 0.2 second) from an interface of both substrates with the radiation curing resin. The curing also progresses in a fixed speed. In a curing apparatus having such a structure, it is hard to adjust a curing degree balance in a radiation curing resin layer (a bonded layer) based on a radiation power or a radioactive ray irradiation time so that it is difficult to control the warpage. In short, it is hard to control the warpage of a disk for the conventional curing apparatus which can control only a term of irradiation and amount of irradiation.

Moreover, the result of the measurement obtained by the warpage test in the apparatus is used for only the discrimination of the excellent and inferior products. Therefore, there is a problem in that the adjustment for decreasing the warpage is to be carried out manually.

The invention has been made in consideration of the problem and has an object to provide an optical recording medium (disk) bonding apparatus which eliminates the warpage of a disk during bonding and has high precision in the bonding.

SUMMARY OF THE INVENTION

The disk bonding apparatus according to the invention is characterized by means for bonding two substrates and then irradiating radioactive rays from both sides of the substrates when carrying out radiation curing and a mechanism for shifting irradiation starts of both radioactive rays, thereby controlling an amount of warpage of each substrate after curing.

More specifically, a first aspect of the invention is directed to a disk bonding apparatus comprising first and second irradiating means provided with a first substrate and a second substrate to be opposed to each other, having the first and second substrates superposed with a radiation curing resin between the two substrates and serving to irradiate radioactive rays from both sides thereof, the radiation curing resin being cured to bond the first and second substrates, wherein irradiation timings of the first and second irradiating means can be adjusted.

This method utilizes that the radiation curing resin is provided between the two substrates and the substrates and the curing resin are integrated by a diffusion generated through a rotation. Then, radioactive rays are to be irradiated from both upper and lower surfaces of the integrated substrates. When this process of the irradiation, upper and lower irradiation start timings are intentionally shifted. The progress for a curing degree in a bonding material layer is started from the interface of the radiation curing resin with the respective substrates. Moreover, the curing progresses in a fixed speed. This method utilizes the property of the curing, it is possible to change a curing balance in a radiation curing resin layer by the intentionally shifting the upper and lower irradiation start timings. Therefore, it is possible to efficiently adjust a warpage state after the curing.

In a second embodiment it is desirable that the disk bonding apparatus should comprise a warpage measuring mechanism for measuring warpage after bonding and curing, and a timing control means for suppressing the warpage by shifting the irradiation timings of the first and second irradiating means based on a result of the measurement of the warpage measuring mechanism. This embodiment can be utilized where the timings of the first and second irradiation timings are adjusted based on the measurement of the warpage after curing to improve the warpage of subsequent disks.

By such a structure, automated control can be carried out and the bonding can be performed efficiently with small warpage and high precision without requiring an additional device.

A second aspect of the invention is directed to a method of bonding a disk comprising the steps of superposing a first substrate and a second substrate with a radiation curing resin between the two substrates and bonding the two substrates to irradiate radioactive rays from both sides thereof, wherein the irradiating step includes a step of controlling an amount of warpage of each of the substrates after curing by shifting irradiation starts of both radioactive rays such that the irradiation start of the radioactive rays is carried out earlier on a substrate side in the first or second substrate where a direction of the warpage is to be predominant.

It is desirable, in the second embodiment, that the method of bonding a disk should further comprise the steps of measuring warpage of the disk after the irradiating step and adjusting an irradiation timing at the irradiating step such that the warpage of the disk is suppressed based on a result of the measurement to improve the warpage of subsequent disks.

According to the method, automated control can be carried out and the bonding can be performed efficiently with small warpage and high precision without requiring an additional device.

DETAILED DESCRIPTION OF THE PREFERRED EMBODIMENTS

An embodiment of the invention will be described below in detail with reference to the drawings.

Figure 2:
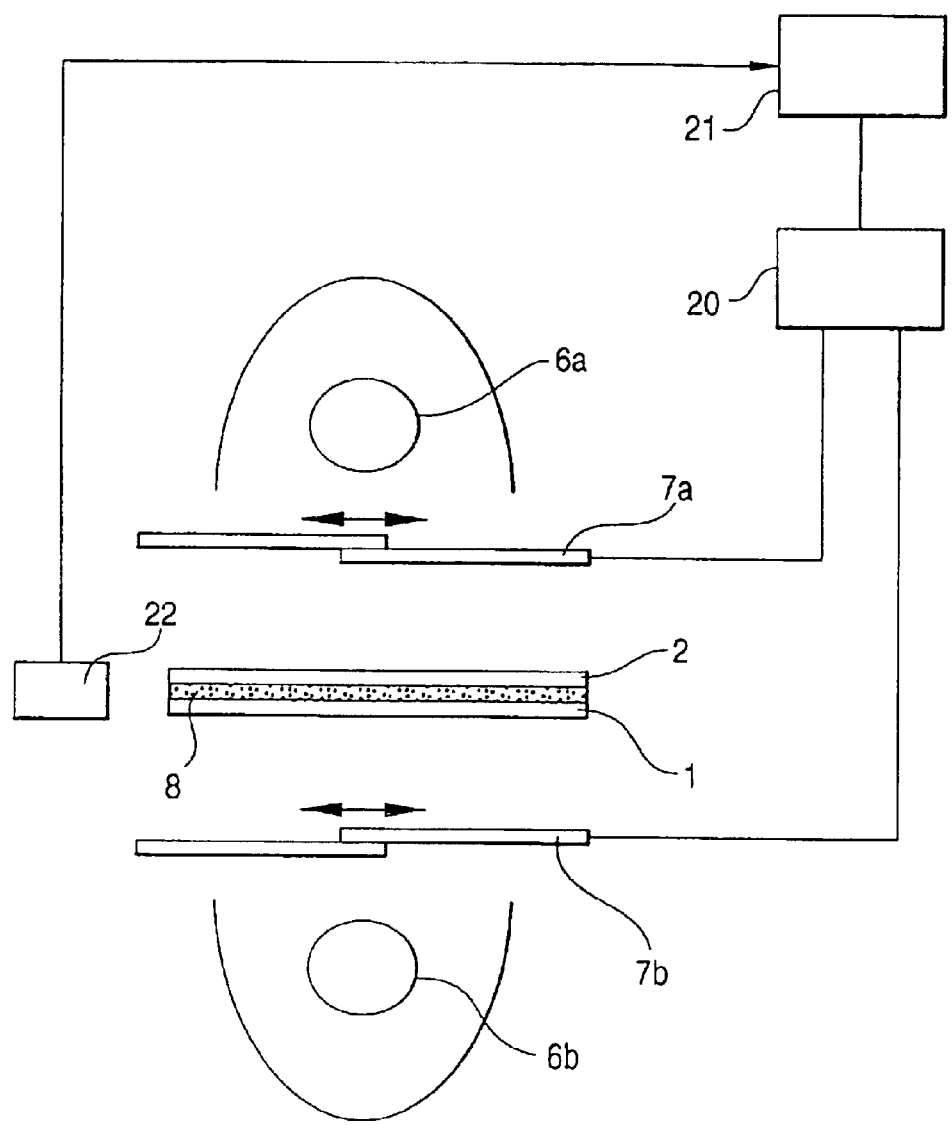
FIG. 2 is a unit arrangement view showing the schematic structure of the optical recording medium apparatus according to the embodiment of the invention.

FIG. 2 shows an optical recording medium manufacturing apparatus comprising a warpage control mechanism according to the embodiment of the invention. The optical recording medium manufacturing apparatus for irradiating radioactive rays 6a and 6b from both sides of first and second substrates 1 and 2 which are superposed comprises a warpage control mechanism 20 for shifting the irradiation starts of the radioactive rays 6a and 6b to change a curing degree balance in a radiation curing resin layer, thereby controlling an amount of warpage of each substrate after curing.

Referring to a direction and an amount which are to be controlled, there is provided a feedback mechanism for carrying out control to determine the irradiation start delay times of both the radioactive rays 6a and 6b through a delay time determining device 21 based on a result of measurement sent from a warpage measuring device 22 provided in the apparatus and to output the irradiation start delay times to the warpage control mechanism 20. The warpage control mechanism 20 serves to drive first and second shutters 7a and 7b provided ahead of the radioactive rays 6a and 6b, thereby controlling the irradiation starts of the radioactive rays 6a and 6b.

By such a structure, even if the warpage of the substrate before the bonding is not constant, it is possible to manufacture an optical recording medium having no warpage and high precision in the bonding.

Next, description will be given to the optical recording medium manufacturing apparatus according to the embodiment of the invention.

Figure 1:
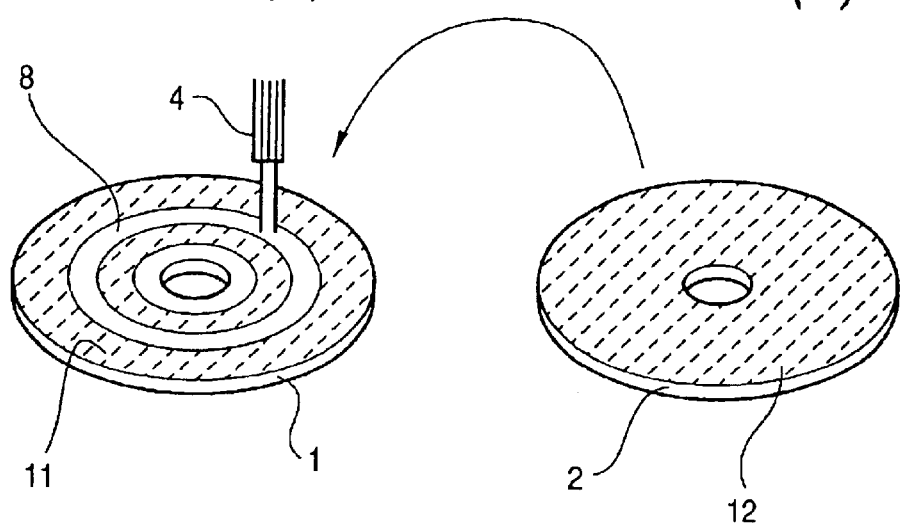
FIGS. 1(a), 1(b) and 1(c) are perspective views showing the main part of a substrate to be supplied to an optical recording medium manufacturing apparatus according to an embodiment of the invention, FIG. 1(a) being a view showing a step in the state of application of a radiation curing resin, FIG. 1(b) being a perspective view showing another substrate to be bonded, and FIG. 1(c) being a perspective view showing a bonding state.
Figure 1:
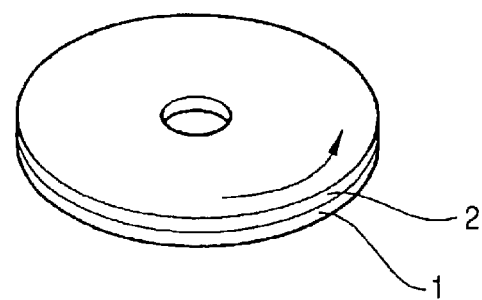

FIG. 1 is a perspective view showing the main part of a substrate to be supplied to the optical recording medium manufacturing apparatus according to the embodiment of the invention, (a) being a view showing a step in the state of application of a radiation curing resin, (b) being a perspective view showing another substrate to be bonded, and (c) being a perspective view showing a bonding state.

FIGS. 1(a) and 1(b) are views showing the first and second substrates 1 and 2 for an optical disk created by an injection method respectively, which are substrates formed of polycarbonate having a thickness of 0.6 mm, a diameter of 120 mm and a center hole diameter of 15 mm.

As shown in FIG. 1(a), an information signal is previously recorded as a concavo-convex pit (not shown) on one of the surfaces of the first substrate 1, and a reflecting layer 11 comprising aluminum as a main component is provided on the first substrate 1. As shown in FIG. 1(b), an information signal is previously recorded as a concavo-convex pit on the second substrate 2 in the same manner as the first substrate 1 and a semitransmitting layer 12 such as gold is previously provided (the pit and the semitransmitting film are not provided but the substrate is used as a dummy substrate in some cases). Consequently, the information signal can be reproduced by laser beam irradiation from an opposite surface to the surface on which the semitransmitting layer 12 of the second substrate 2 is provided. (In the case in which the second substrate 2 is used as the dummy substrate, the reproduction can be carried out from an opposite surface to the surface on which the reflecting layer 11 of the first substrate 1 is provided).

First of all, a radiation curing resin 8 is dropped through a nozzle 4 onto the first substrate 1 provided on a mounting table comprising rotating means (not shown) and adsorbing means (not shown). In the embodiment, a UV curing resin is used for the radiation curing resin. In order to apply the radiation curing resin like a doughnut, the first substrate 1 is rotated at a low speed by the rotating means. In the embodiment, the rotation is carried out at 25 rpm.

As shown in FIG. 1(c), next, the first substrate 1 and the second substrate 2 are bonded closely such that center holes are concentrical and both signal surfaces are opposed to each other.

After the close bonding, the first substrate 1 and the second substrate 2 which are provided on the rotating means are rotated at a high speed so that the diffusion of the UV curing resin can be accelerated in the direction of an outer periphery and a uniform radiation curing resin layer can be generated. In the embodiment, the rotation is carried out at 3000 rpm.

Next, description will be given to a curing method using a double-sided radioactive ray irradiating apparatus shown in FIG. 2.

First of all, the first substrate 1 and the second substrate 2 are superposed with a radiation curing resin between the two substrates and are rotated at a high speed by the method described above, and are thereby set onto the double-sided radioactive ray irradiating apparatus in a state in which the UV curing resin is diffused in the direction of the outer periphery and the uniform radiation curing resin layer is generated.

First of all, in the first embodiment, an amount of warpage is measured by the warpage measuring device 22 and a delay time is determined by means of the delay time determining device 21 based on a result of the measurement sent from the warpage measuring device 22. A priority and a delay time thereof are determined and output to the warpage control mechanism 20.

The warpage control mechanism 20 controls the opening and closing operations of the shutters 7a and 7b based on the delay time.

Then, the shutters are sequentially opened and radioactive rays are irradiated from the first and second substrate sides with a starting time shifted sequentially.

Thus, an optical information medium having no warpage is formed.

It is possible to obtain an optical information is medium in which a curing (gelation) balance in a radiation curing resin layer is changed, a warpage state is adjusted after the curing and the warpage is reduced efficiently by utilizing that a radiation curing resin is provided between the two substrates and the progress for a curing degree in a bonding material layer is started from the interface of the radiation curing resin and the respective substrates when the radioactive rays are to be irradiated from both upper and lower surfaces of the integrated substrates by a diffusion generated through a rotation.

Thus, it is possible to control an irradiation timing based on such a timing as to open a shutter between a UV lamp and a substrate and to efficiently carry out bonding with high precision.

The warpage measuring mechanism for measuring an amount of warpage is provided in the curing device to measure the amount of warpage before the curing and to control the delay time for each substrate according to the result of the measurement in the embodiment.

Moreover, the warpage of the substrate before the bonding may be measured to adjust the delay time based on a difference between the warpage and a reference value.

Furthermore, the warpage may be measured before and after the curing to adjust the delay time based on a difference therebetween.

Figure 3:
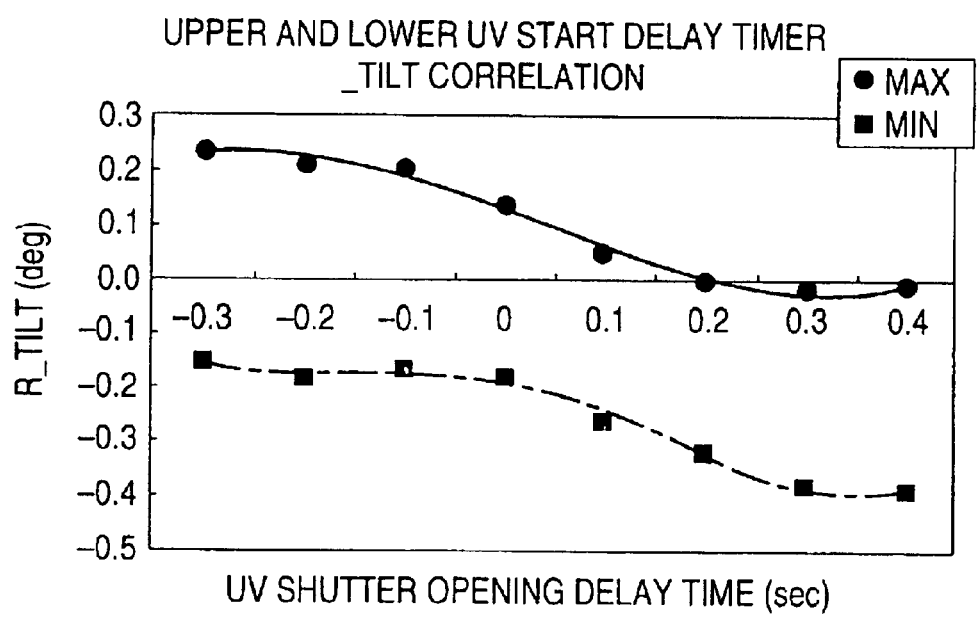
FIG. 3 is a graph representing the relationship between upper and lower irradiation start delay times and a tilt (warpage).

FIG. 3 shows a result obtained by changing the delay time through the opening and closing operations of the shutter, thereby measuring the amount of warpage. A solid line indicates a maximum value and a broken line indicates a minimum value.

Moreover, while the delay time is controlled by using the shutter in the embodiment, the control may be carried out by the ON/OFF operation of a lamp.

Furthermore, while the radiation curing resin is used in the embodiment, the invention is not restricted to the radioactive rays but can be applied to a bonding step using such a material as to be cured by an energy other than the radioactive rays, for example, a thermosetting resin. For example, it is preferable that a heating timing should be shifted in the case of a heat energy.

As described above, according to the invention, it is possible to manufacture an optical recording medium having no warpage and high precision in bonding by adjusting a curing start to control a curing balance in a curing resin.

What is claimed is:

1. A disk bonding apparatus for bonding a first substrate and a second substrate, the apparatus comprising:

an arrangement means for arranging the first substrate and the second substrate to be opposed to each other;

an arrangement means for superposing the first substrate and the second substrate with a radiation curing resin between the two substrates;

a first irradiating means for serving to irradiate radioactive rays from a first side of the superposed substrates; and a second irradiating means for irradiating the substrates from a second side of the superposed substrates; and a warpage measuring mechanism for measuring amounts of warpages of the first substrate and the second substrate; and a start timing control means for suppressing warpage of the bonded substrates by shifting the irradiation start timings of the first and second irradiating means based on a result of the measurement of the warpage measuring mechanism.

2. A method of bonding a disk comprising the steps of:

superposing a first substrate and a second substrate with a radiation curing resin between the two substrates;

irradiating radioactive rays from both sides of the superposed substrates in order to bond the substrates, wherein the irradiating step includes the step of:

controlling the amount of warpage of the disk after curing comprising the steps of:

selecting a substrate from the first and second substrate, wherein the selected substrate has a smaller curvature than the other substrate; and, shifting the irradiating start timings of both radioactive rays so that the irradiating on the selected substrate starts earlier than the other substrate.

3. The method of bonding a disk according to claim 2, wherein prior to the step of irradiating radioactive rays from both sides of the superposed substrates in order to bond the substrates the controlling step further comprises:

measuring warpage of the first substrate and the second substrate in the superposed state.

4. The method of bonding a disk according to claim 2, wherein after the step of irradiating radioactive rays from both sides of the superposed substrates in order to bond the substrates the controlling step further comprises:

measuring warpage of the first substrate and the second substrate in the superposed state.

* * * * *